United States Patent [19]
Martin et al.

[11] Patent Number: 4,741,304
[45] Date of Patent: May 3, 1988

[54] ELECTRONIC ENGINE OIL DISPENSER

[76] Inventors: Charles E. Martin, 2511 Holloway, Midland, Tex. 79701; George Spector, 233 Broadway RM 3615, New York, N.Y. 10007

[21] Appl. No.: 840,093

[22] Filed: Mar. 17, 1986

[51] Int. Cl.⁴ .............................................. F02M 1/00
[52] U.S. Cl. ................................ 123/196 S; 184/103.1
[58] Field of Search ..................... 123/196 S, 196 R; 184/103.1

[56] References Cited

U.S. PATENT DOCUMENTS

| | | | |
|---|---|---|---|
| 4,299,307 | 11/1981 | Scott | 184/103.1 |
| 4,480,718 | 11/1984 | Marinelli | 184/103.1 |
| 4,542,718 | 9/1985 | Hurner | 123/196 S |
| 4,584,977 | 4/1986 | Lenk et al. | 123/196 S |
| 4,603,666 | 8/1986 | Martinelli | 123/196 S |

*Primary Examiner*—E. Rollins Cross

[57] ABSTRACT

An automatic engine oil dispenser and indicator is provided and consists of a device for sensing low engine oil pressure, a reservoir storing a quantity of oil when the engine oil pressure is at a specified level, a device for indicating a low amount of oil in the reservoir and a check valve communicating with the reservoir. The check valve allows unrestricted flow of the oil from the reservoir to the engine when the engine oil pressure falls below the specified level until the oil pressure in the engine rises back to the specified level stopping the oil flow.

4 Claims, 1 Drawing Sheet

ELECTRONIC ENGINE OIL DISPENSER

BACKGROUND OF THE INVENTION

The instant invention relates generally to lubricating systems for engines and more specifically it relates to an automatic engine oil dispenser and indicator.

Numerous lubricating systems for engines have been provided in prior art that are adapted to utilize oil reservoirs. For example U.S. Pat. Nos. 3,763,960; 3,804,201 and 4,094,293 all are illustrative of such prior art. While these units may be suitable for the particular purpose to which they address, they would not be suitable for the purposes of the present invention as heretofore described.

SUMMARY OF THE INVENTION

A principle object of the present invention is to provide an automatic engine oil dispenser and indicator that will automatically replace oil to the engine from a reservoir.

Another object is to provide an automatic engine oil dispenser and indicator that will alert the occupants of the vehicle that engine oil pressure is low.

An additional object is to provide an automatic engine oil dispenser and indicator that will alert the occupants of the vehicle that the amount of oil in the reservoir is low.

A further object is to provide an automatic engine oil dispenser and indicator that is simple and easy to use.

A still further object is to provide an automatic engine oil dispenser and indicator that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURE

The single FIGURE illustrates a top diagrammatical view partly in section of an engine compartment with the automatic engine oil dispenser and indicator installed therein.

DETAILED DESCRIPTION OF THE PREFERRED EMBODIMENT

Figure 1:
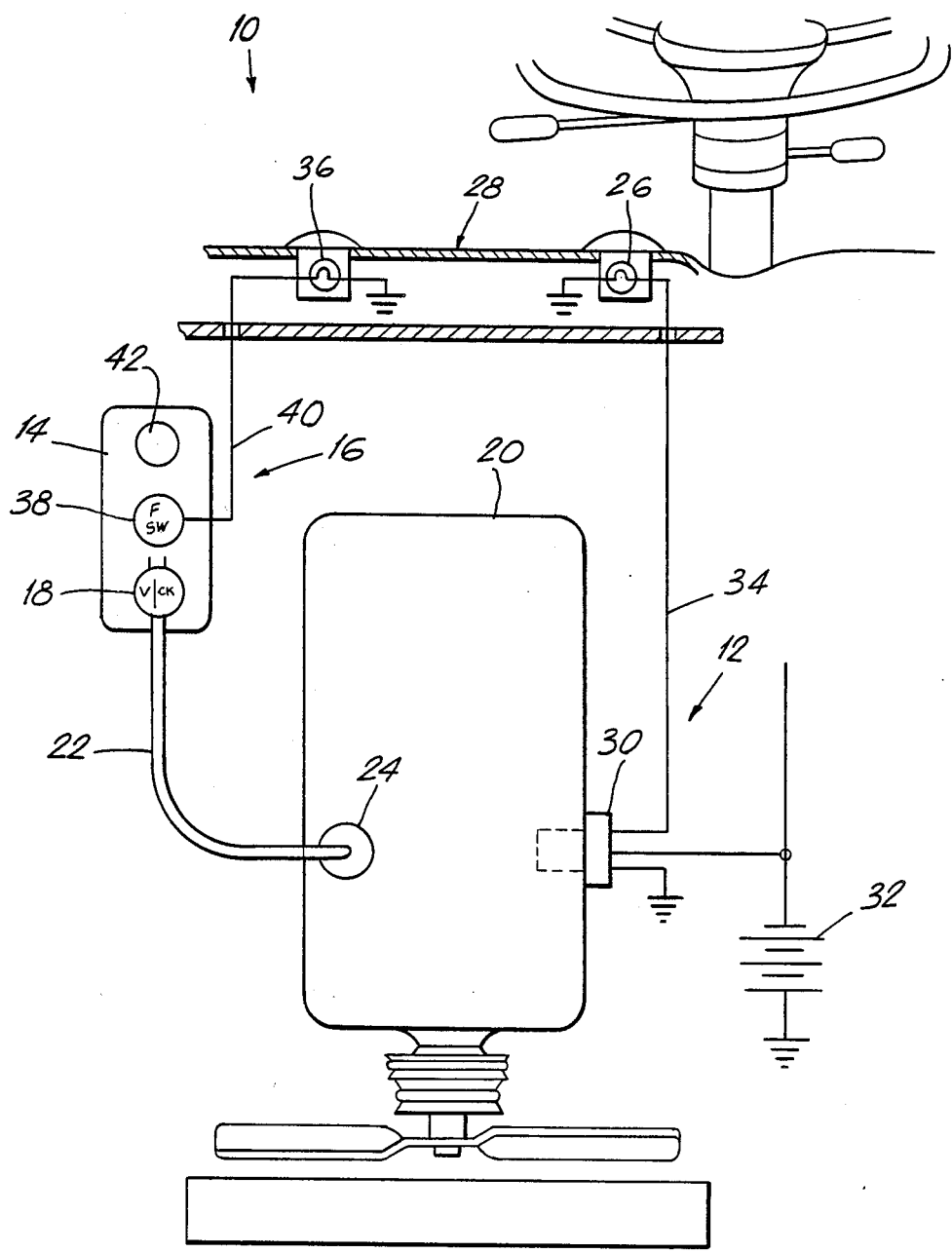

Turning now descriptively to the drawing in which an automatic engine oil dispenser and indicator 10 is illustrated and consists of a device 12 for sensing low engine oil pressure, a reservoir 14 storing a quantity of oil when the engine oil pressure is at a specified level, a device 16 for indicating a low amount of oil in the reservoir 14 and a check valve 18 communicating with the reservoir 14. The check valve 18 allows unrestricted flow of the oil from the reservoir 14 to the engine 20, via a hose 22 and adapter 24, when the engine oil pressure falls below the specified level. When the oil pressure in the engine 20 rises back to the specified level the oil flow will stop.

The device 12 for sensing low engine oil pressure consists of a first warning light 26 mounted to a dashboard 28 and a sensor 30 mounted in oil system of the engine 20. The sensor 30 converts the low oil pressure into an electrical signal via battery 32 and sends the signal via wire 34 to the first warning light 26.

The device 16 for indicating a low amount of oil in the reservoir 14 consists of a second warning light 36 mounted to the dashboard 28 and a float switch 38 mounted within the reservoir 14. The float switch 38 sends an electrical signal via wire 40 to the second warning light 36 when a low amount of oil is in the reservoir 14.

The automatic engine oil dispenser and indicator 10 further contains a filler cap 42 detachably mounted to top of the reservoir 14. When the second warning light 36 is activated a new supply of oil can be replaced within the reservoir 14.

The reservoir 14, hose 22, adapter 24 and filler cap 42 are fabricated from durable plastic material. The reservoir can hold from one to four quarts of oil depending upon type of engine serviced by the invention.

In operation, when the first warning light 26 goes on it will indicate to the occupants of the vehicle that the oil pressure level in the engine 20 is low. The check valve 18 will open automatically in the reservoir 14 and allow oil to flow into the engine 20 until the oil pressure level is back to normal.

If the second warning light 36 goes on it will indicate to the occupants of the vehicle that the oil is low in the reservoir 14. The vehicle must be stopped immediately and oil replaced in the reservoir by removing the filler cap 42. Running the engine 20 with low oil pressure may cause engine damage.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An automatic engine oil dispenser and indicator which comprises
   (a) means for sensing low engine oil pressure;
   (b) a reservoir storing a quantity of oil when said engine oil pressure is at a specified level;
   (c) means for indicating a low amount of said oil in said reservoir; and
   (d) an automatic check valve communicating with said reservoir, said check valve being responsive to engine oil pressure to open and allow unrestricted flow of said oil from said reservoir to said engine when said engine oil pressure falls below a specified level until said oil pressure in said engine rises back to said specified level thereby closing said valve.

2. An automatic engine oil dispenser and indicator as recited in claim 1, wherein said means for sensing low engine oil pressure comprises;
   (a) a first warning light mounted to a dashboard; and
   (b) a sensor mounted in oil system of said engine, said sensor converts said low oil pressure into an electrical siginal and sends it to said first warning light.

3. An automatic engine oil dispenser and indicator as recited in claim 2, wherein said means for indicating a low amount of said oil in said reservoir comprises:
   (a) a second warning light mounted to said dashboard; and (b) a float switch mounted within said reservoir, said float switch sends an electrical signal to said second warning light when a low amount of said oil is in said reservoir.

4. An automatic engine oil dispenser and indicator as recited in claim 3, further comprising a filler cap detachably mounted to top of said reservoir so that when said second warning light is activated a new supply of oil can be replaced within said reservoir.

* * * * *